Figure 1:
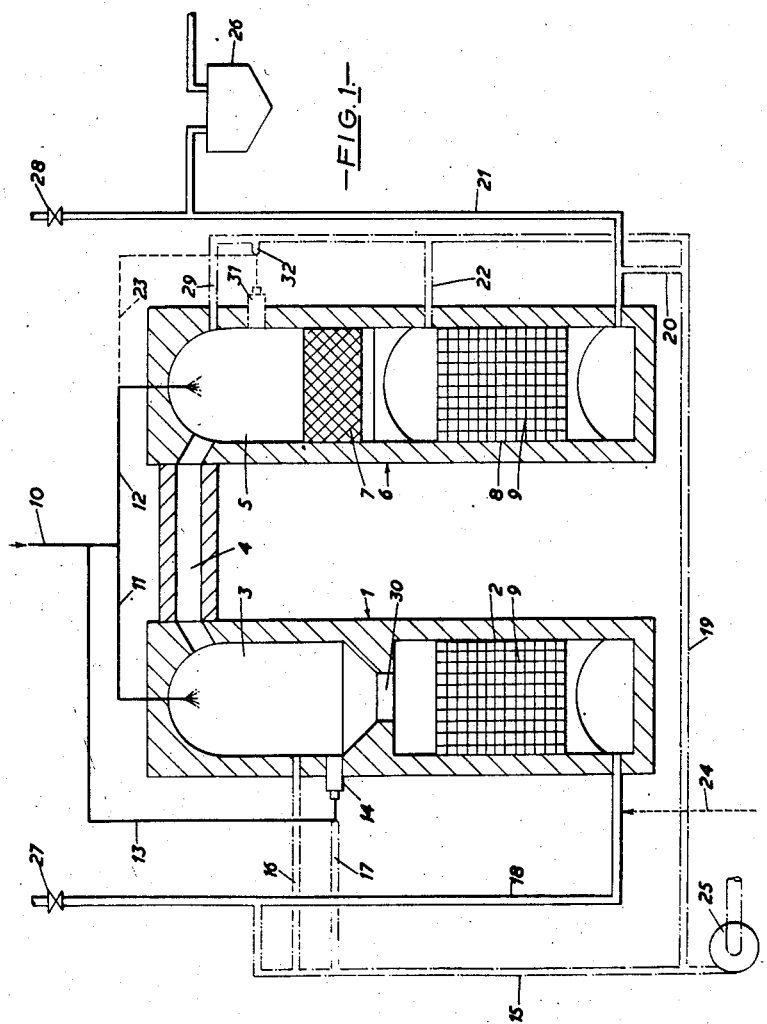

April 1, 1958  K. RUSCHIN ET AL  2,829,034
MANUFACTURE OF COMBUSTIBLE GASES
Filed Jan. 11, 1955  3 Sheets-Sheet 1

Inventors
KURT RUSCHIN
GEOFFREY MILNER
By
Mead, Browne, Schuyler & Beveridge
Attorneys April 1, 1958 K. RUSCHIN ET AL 2,829,034
MANUFACTURE OF COMBUSTIBLE GASES
Filed Jan. 11, 1955 3 Sheets-Sheet 2
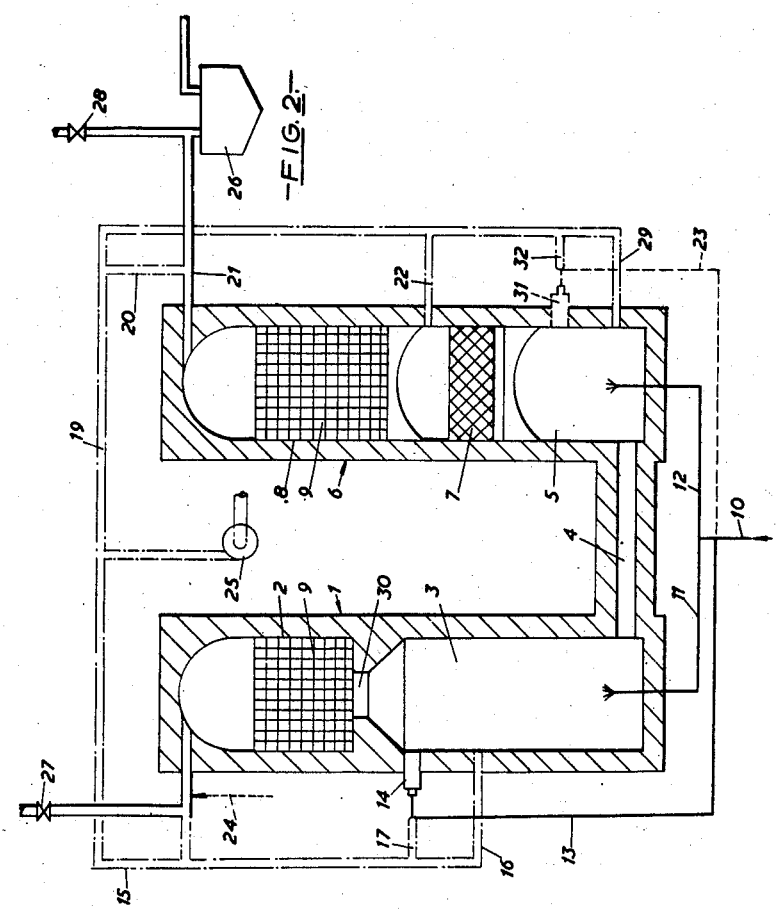
Inventors
KURT RUSCHIN
GEOFFREY MILNER
By
Mead, Browne, Schuyler & Beveridge
Attorney

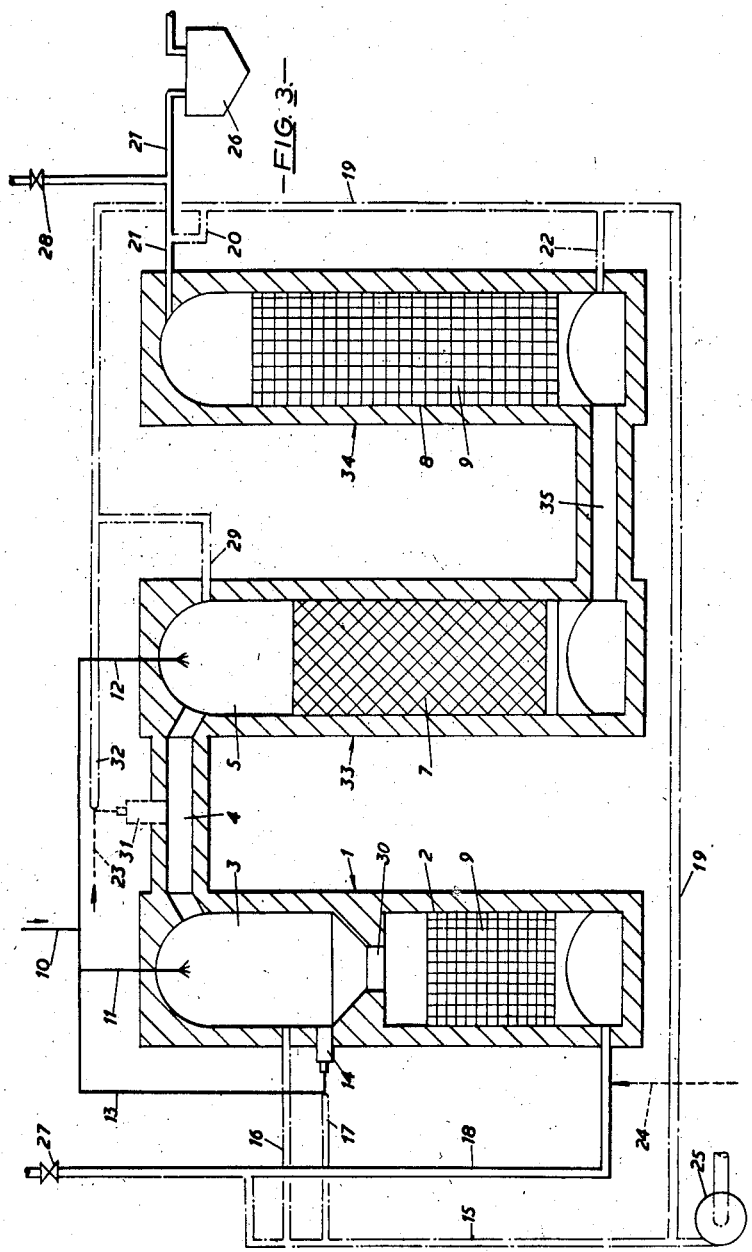

2,829,034

MANUFACTURE OF COMBUSTIBLE GASES

Kurt Ruschin and Geoffrey Milner, Stockton-on-Tees, England, assignors to The Power-Gas Corporation Limited, Stockton-on-Tees, England, a British company Application January 11, 1955, Serial No. 481,190

Claims priority, application Great Britain January 14, 1954

2 Claims. (Cl. 48—214)

The present invention relates to a process for the production of a combustible gas from hydrocarbon oil and more especially to a process for producing a combustible gas by thermal catalytic cracking of hydrocarbons in the presence of steam. The present invention is particularly applicable to the production of a gas which is substantially interchangeable with, or usable as an addition to, town gas or the like. Liquid hydrocarbons can be used as feed stock for the process but the process is particularly developed for the use of heavy oils.

An object of the present invention is to produce from a hydrocarbon oil a combustible gas which has physical and combustion characteristics substantially similar to those of town gas so that the process is eminently suitable for use in meeting peak load requirements of an existing town gas system or for providing an entire gas supply which can be used in normal town gas consuming appliances without necessitating extensive modifications thereto.

The process of the present invention is a cyclic one and each cycle includes a make period and a heating period, each make period involving passing steam through a first zone containing hot heat-storing refractory material to preheat the steam, passing the preheated steam through a second zone maintained at a temperature sufficiently high to vapourize and partially crack the hydrocarbon oil, spraying the hydrocarbon oil into said second zone countercurrent to the flow of said steam, whereby said oil is substantially entirely vapourized and partially cracked in said second zone, passing the resultant vapourous mixture from said second zone through a third zone containing a catalyst which actively promotes the reaction between hydrocarbons and steam resulting in the formation of carbon monoxide and hydrogen and maintained at a temperature suitable for further cracking of hydrocarbons in contact with the catalyst and passing the resultant gaseous mixture from said third zone through a fourth zone containing heat-storing refractory material; each heating period involving passing air through the fourth zone containing heated refractory material to preheat the air, passing the preheated air through the third zone containing the active catalyst in direct contact with combustible material deposited on the catalyst, which combustible material burns in the presence of the preheated air, passing the resulting products of combustion and the balance of the preheated air through a second zone and then through the first zone containing heat storing refractory material. During operation of the process, temperatures can often be most conveniently ascertained by using one or more pyrometers at desired localities and while it is difficult in practice to obtain true temperatures at such localities due for example to the effects of radiation from the walls of vessels defining the zones, indicated temperatures should be in the range of 450° to 1000° C. in the case of the third zone.

The process of the present invention is eminently suitable for use with heavy oils since the hydrocarbon oil or at least the greater part of it can be vapourized in the second zone before it is passed into the third zone wherein it comes into contact with the catalyst. The reaction which takes place when the mixture of steam and hydrocarbon oil comes into contact with the catalyst is endothermic and the necessary quantity of heat is supplied to the third zone during the heating periods. During the make period the mixture of hydrocarbon oil and steam is brought into contact with the catalyst and during the heating period heat is imparted to the catalyst.

The process according to the invention has the advantage over prior processes in that the hydrocarbon oil is substantially entirely vapourized and partially cracked in the second zone, thereby avoiding contact of the hydrocarbon oil with the catalyst mass and so reducing the amount of carbon or other combustible material which would be deposited on the catalyst, while achieving efficient heat recovery by means of regenerators containing heat-storing material. By this means a closer control of the temperatures throughout the system can be obtained resulting in the more uniform production of a combustible gas of the desired composition.

Suitable apparatus for carrying out the process of the invention includes at least two vessels defining four zones connected with one another in sequence, the first and the fourth of said zones containing heat-storing refractory material, whilst the third of said zones contains a catalyst, conduit means for feeding steam at least to the first of said zones, hydrocarbon oil to at least the second of said zones and air to at least the fourth of said zones, conduit means for receiving a combustible product gas from the fourth of said zones, and conduit means for discharging products of combustion from the first of said zones.

The apparatus may include four separate interconnected vessels each defining one of said zones. In another form the apparatus may include three interconnected vessels, one of said vessels defining the first and second zones. A preferred apparatus includes two interconncted vessels one of said vessels defining the first and second zones and the other of said vessels defining the third and fourth zones. The second zone may be in the form of an empty chamber or it may contain a grid or a layer of refractory material.

During the make period the steam-oil mixture flows through the zone containing the catalyst in one direction but during the heating period air flows through that zone in the opposite direction, such air being hereinafter referred to as forward blast, through in addition means may be provided to pass some air through the catalyst-containing zone during the heating period in said one direction, that is to say, in the same direction as the steam-oil mixture is passed, in case this is required for better temperature control, such air being hereinafter referred to as back blast. During the make period the combustible gas produced in the third zone by contact of the steam-oil mixture with the catalyst passes through the fourth zone and imparts some heat to the heat-storing refractory material contained therein. During the heating period air is introduced into the fourth zone and is preheated by transfer of heat thereto from this heat-storing refractory material and is then passed into the third zone to support combustion of carbonaceous matter deposited upon the catalyst. Part of the heat of combustion is imparted to the catalyst thereby raising its temperature whilst another part thereof is carried with the combustion gases into the second and first zones in sequence and some of this heat is imparted to the heat-storing refractory material in the first zone to be used later during the make period of a subsequent cycle for superheating steam introduced into the first zone.

In some instances particularly when using heavy oil for the production of combustible gas, some carbon will be deposited on the catalyst during the make period and this carbon is burnt off during the heating period to heat up the catalyst bed which has cooled down due to the endothermic reactions which take place during the make period. The heat supplied to the system by burning off this carbon and carbon deposited anywhere else in the plant can be supplemented by heat supplied by means of one or more burners which will come into operation during the normal heating (forward blast) and/or the back blast. This additional heat can be supplied by burning gas or oil or tar, for instance, tar recovered as a by-product of this process.

In other instances particularly when using a lighter oil for the production of combustible gas, it may be desirable to introduce additional oil into the catalyst chamber so as to increase the amount of carbon deposited on the catalyst with the object of increasing the heat supplied to the system by burning off deposited carbon during the heating period.

With a view to making the process self-supporting in steam a waste heat boiler may be provided together with conduit means for passing thereto the products of combustion leaving the said first zone during the heating period and if the waste heat in the products of combustion leaving the said first zone is not sufficient to produce all the steam required an additional heat supply to the waste heat boiler may be provided. Such additional heat supply may conveniently include the provision of a special burner in the hot gas inlet chamber of the waste heat boiler together with means for supplying combustible material such as gas, oil or tar thereto during the make period of the cycle thereby increasing the total steam production of the waste heat boiler without necessitating an increase in its heating surface or in the capacity of an air blower supplying air to the apparatus. Such combustible material may be in the form of some of the combustible gas produced by the process or may be for instance tar recovered as a by-product of the process.

The catalyst which is used in the catalyst chamber may be any catalyst which promotes the reaction between hydrocarbons and steam resulting in the formation of carbon monoxide and hydrogen, including catalysts containing nickel, cobalt or iron. The preferred catalyst consists essentially of a mixture of alumina and calcium oxide prepared according to the manner disclosed in British patent specification No. 666,524.

The process of the present invention will be further described by way of example with reference to the accompanying drawings which illustrate three forms of apparatus suitable for carrying out the cyclic process of the invention and in which:

Fig. 1 illustrates diagrammatically one embodiment of the invention including two vessels each defining two zones, Fig. 2 illustrates diagrammatically a second embodiment being a modification of the embodiment illustrated in Fig. 1, and Fig. 3 illustrates diagrammatically a third embodiment including three vessels, one of which defines two zones whilst the other two each define one zone.

Referring first to Fig. 1, a first vessel 1 defines a first zone or superheater 2 and a second zone or carburettor 3 an upper level of which communicates via a passage 4 with an upper level of a third zone or catalyst chamber 5 containing a catalyst bed 7 and defined by a second vessel 6 which also defines a fourth zone or air preheater 8. The superheaters 2 and 8 each contain heat-storing refractory material in the form of chequer work 9.

Hydrocarbon oil feed stock is delivered to conduit 10 which communicates via conduit 11 with the top of the carburettor 3. A conduit 18 communicates with a lower region of the superheater 2 and a conduit 24 communicating with conduit 18 leads from a supply of steam. A conduit 21 communicates with a low level of the air preheater 8 and communicates with a wash box 26. Air delivered by a blower 25 is received by a conduit 19 which communicates through a conduit 20 with the conduit 21.

During the make period of a cycle steam flows through conduits 18 and 24 into superheater 2 defined by vessel 1 and is therein superheated by receiving heat from the chequer work 9 heated during the heating period of a previous cycle as will be hereinafter described and then passes into the carburettor 3 into which hydrocarbon oil is sprayed through conduit 11. The vapourous mixture of steam and oil passes along passage 4 into the catalyst chamber 5 where it is brought into contact with the catalyst mass 7. The product gases then pass into the air preheater 8 and thence via the conduit 21 to the wash box 26 in which some of the products of cracking are condensed.

During the heating period air from blower 25 passes through conduits 19, 20 and 21 into the air preheater 8 wherein it receives some heat from the chequer work 9. The air then passes through the catalyst bed 7 and some of the carbonaceous material deposited on the catalyst during the previous make period is burned. Some of the heat of combustion is imparted to the catalyst bed 7 and the products of combustion pass through the passage 4 into carburettor 3 and thence into the steam superheater 2 wherein some of the heat of combustion is imparted to the chequer work 9. The products of combustion then pass into the conduit 18 and thence to the atmosphere via a stack valve 27 or to a waste heat boiler and thence to the atmosphere.

During the heating period additional heat may be provided for storage in the chequer work 9 of the steam preheater 2 or for raising the temperature of the catalyst by providing additional burners 14, 31 at a low level in the carburettor 3 and at a medial level in the catalyst chamber 5 respectively and by supplying combustible material in the form of hydrocarbon oil through conduits 13 and 23 respectively and air through conduits 15 and 17, 19 and 32 respectively which lead from the blower 25. To this end also additional hydrocarbon oil can if desired be introduced to the top of the catalyst chamber 5 during the make period of a cycle by means of a conduit 12.

In order to promote the more complete combustion of any carbonaceous material deposited on the catalyst bed during the heating period of a cycle additional air can if required be introduced through a conduit 22 which communicates with the conduit 19 and leads into an upper level of the air preheater 8 above the chequer work 9. Alternatively after the completion of a heating period of the cycle a back blast of air may be passed through parts of the apparatus, for example, by means of a conduit 16 which communicates with the conduit 15 and leads to a medial level in the carburettor 3 or by interconnecting the conduits 15 and 18 to introduce air to a low level in the steam preheater 2, or by means of a further conduit 29 which is connected to the conduit 19 and communicates with an upper level in the catalyst chamber 5. Air entering through any one or any combination of these conduits 16, 18, 29, would flow through at least the catalyst chamber 5 and air preheater 8 and burn off any remaining carbon, being finally discharged through the conduit 21 and a stack valve 28 to the atmosphere or through the waste heat boiler to the atmosphere.

Since the hydrocarbon oil is introduced into the top of the carburettor 3 during the make period of a cycle substantially all the oil is vapourized and is partially cracked before it comes into contact with the catalyst bed 7 in the catalyst chamber 5 thereby reducing the amount of contact of hydrocarbon oil directly with the catalyst. Preferably a restricted passageway or throat 30 is provided intermediate the steam preheater 2 and the carburettor 3 with a view to restricting the cross sectional area of the passageway so as to induce in it a sufficiently high velocity of the steam passing into the carburettor and so minimise the risk of any hydrocarbon oil introduced at the top of the carburettor 3 or of any carbon or carbonaceous material formed due to the partial cracking of the hydrocarbon oil in the carburettor passing downwardly out of the carburettor into the steam preheater. Any carbon or carbonaceous material which might be deposited on the wall of the carburettor will, of course, be burnt off during the heating period of a cycle and to facilitate this the passage 4 between the catalyst chamber 5 and the carburettor 3 may be arranged generally tangentially and if desired additional tangentially disposed conduits may be provided for introducing scurfing air which air may also serve to assist in burning any combustibles in the gases coming from the catalyst chamber 5 to the carburettor 3 during the heating period.

It will be noted from the drawings that in the embodiment illustrated in Fig. 1 the carburettor 3 is located above the steam superheater 2 and the catalyst chamber 5 is located above the air preheater 8 so that during the make period of a cycle steam passes upwardly through the steam preheater 2, upwardly through the carburettor 3 meeting the hydrocarbon oil in counter-current flow and the resulting vapourous mixture of steam and oil is passed downwardly through the catalyst chamber 5 and the resulting product gases thence downwardly through the air preheater 8. Conversely during the heating period the path of the air introduced through the conduit 20 is upwardly through the air preheater 8, upwardly through the catalyst chamber 5 and the resulting products of combustion thereafter pass downwardly through the carburettor 3 and downwardly through the steam superheater 2.

As an alternative the chambers in the two vessels can be arranged in such a way that the cross connection is at the bottom of the two vessels and consequently the regenerators are in the top parts of the two vessels and still maintaining all important features stated above, as for instance, counterflow of oil and steam in the carburettor. Such an apparatus is illustrated in Fig. 2 in which like reference numerals indicate like parts of Fig. 1. It is believed that arrangement and operation of the apparatus of Fig. 2 will be readily apparent to one skilled in the art from the foregoing description of Fig. 1 without further detailed description.

A further alternative is to arrange the four chambers or zones in three or four vessels instead of two and the embodiment illustrated in Fig. 3 is indicative of apparatus including three vessels. Referring now to Fig. 3 in which like reference numerals indicate like parts of the apparatus illustrated in Fig. 1, the second vessel 6 of Fig. 1 is replaced by an intermediate or second vessel 33 defining the third zone or catalyst chamber 5 containing the catalyst bed 7, and a third vessel 34 defining the fourth zone or air preheater 8. The top of the first vessel 1 communicates with the top of the second vessel 33 via the passage 4 whilst the bottom of the second vessel 33 communicates with the bottom of the third vessel 34 via a further passage 35. The conduits 11 and 13, 15, 16, 17 and 18, and 24 feeding hydrocarbon oil, air and steam respectively to the steam superheater 2, carburettor 3, and additional burner 14, if dequired, are arranged substantially the same as in the apparatus illustrated in Fig. 1. The conduit 21 through which the combustible gas is delivered to the wash box 26 and into which air is fed during the forward blast of a heating period of a cycle and from which products of combustion are discharged via the stack valve 28 during a back blast, communicates with the top of the third vessel.

The conduit 22 for introducing additional air if required during the heating period can communicate with the bottom of the third vessel 34 as illustrated or alternatively could be arranged to communicate with the bottom of the second vessel 33 below the catalyst 7. The conduit 29 in similar manner to that in the apparatus of Fig. 1 communicates with the top of vessel 33 above the catalyst 7. The additional burner 31 instead of being located in the upper region of the catalyst chamber 5 in the second vessel of Fig. 1 can be located in the passageway 4 communicating between the first and second vessels and is fed with combustible material through the conduit 23 and with air through the conduit 32. The combustible material can be hydrocarbon oil or can be a gaseous fuel or yet again can be some of the combustible gas produced in the apparatus by the process of the present invention.

In operation the directions of flow of the steam, vapourous steam-oil mixture, product combustible gas, and air through the first and second vessels are substantially the same as those described with reference to the embodiment illustrated in Fig. 1, but it will be readily apparent that the direction of flows of the product combustible gas and air through the air preheater 8 in vessel 34 are opposite to those described with reference to Fig. 1.

It has been found that a combustible gas can be produced by the process of the present invention which is a substitute for normal town gas produced by the carbonisation of coal and that such combustible gas can have a gross calorific value between 400 and 550 B. t. u.'s per cubic foot (at a pressure of 30" of mercury and at a temperature of 60° F. saturated with water vapour) and has a specific gravity (air=1) from 0.4 to 0.62.

With certain oils, better control and efficiency can be obtained by filling the carburettor with refractory material, this can be done using chequer bricks or other filling material.

The following example is illustrative of the operation of the process. The apparatus used was substantially as illustrated in Fig. 3, and comprised three vessels, the first comprising a steam preheater surmounted by an empty carburettor, the second comprising a catalyst bed and the third comprising a regenerative air preheater. During the make period steam was passed upwards through the steam preheater and heavy petroleum oil was introduced downwards at the top of the empty carburettor in the first vessel. The heated vapourous steam-oil mixture passed from the top of the first vessel downwards through the catalyst bed in the second vessel, combustible gas being formed, and the hot combustible gas from the bottom of the second vessel passed upwards through the third vessel (air preheater) heating up the heat-storing material therein. During the heating period air was passed downwards through the air preheater, the preheated air passed upwards through the catalyst bed, combustion of carbon deposited on the catalyst taking place, and the hot products of combustion from the top of the second vessel passed downwards through the first vessel (steam preheater) heating up the heat-storing material. Some fuel gas was burned with air in the conduit connecting the tops of the first and second vessels to provide additional hot products of combustion for passing downwards through the first vessel.

The heating and making periods were of approximately equal duration throughout the cycle of operations, which also included sort periods for purging with steam.

The ratio of steam to oil, by weight, during the make period varied from 1.1 to 1.2. The combustible gas which was produced had a calorific value generally between 450 and 500 B. t. u.'s per cubic foot and a specific gravity (air=1) generally between 0.5 and 0.55.

Temperatures at various points were measured by means of pyrometers and the following table gives the range of temperatures which were found during operation.

| Location | Temperature in ° C. | |
|---|---|---|
| | End of Heating Period | End of Make Period |
| Steam preheater 2—base | 550 to 650 | 500 to 600 |
| Steam preheater 2—top | 700 to 800 | 550 to 650 |
| Catalyst bed 7—top | 750 to 800 | 700 to 750 |
| Catalyst bed 7—centre | 950 to 1,000 | 925 to 975 |
| Catalyst bed 7—base | 450 to 500 | 500 to 550 |
| Air Preheater 8—base | 400 to 450 | 450 to 500 |
| Air Preheater 8—top | 180 to 230 | 220 to 270 |

We claim:

1. A cyclic process for the production of combustible gas having a gross calorific value of from 400 to 550 B. t. u.'s per cubic foot from hydrocarbon oil, each cycle including a make period and a heating period comprising during the make period the steps of passing steam upwardly through a first zone containing hot heat-storing refractory material to preheat the steam, said material having been heated during the heating period, passing the resulting pre-heated steam upwardly through a second zone, spraying said hydrocarbon oil into said second zone counter-current to the flow of said preheated steam to substantially entirely vaporize said oil, said second zone having a temperature sufficient to vaporize said oil, passing the resulting vaporous mixture of steam and oil from said second zone downwardly into a third zone containing a catalyst, said third zone having a temperature of from 500° to 975° C. measured by pyrometers on the periphery of said zone, cracking said vaporous mixture of steam and oil in contact with said catalyst at said temperature range of from 500° to 975° C. to form carbon monoxide and hydrogen, passing the resultant gaseous mixture of carbon monoxide and hydrogen from said third zone downwardly through a fourth zone containing hot heat-storing refractory material, collecting said gaseous mixture upon passing through said fourth zone, and, during the heating period, the steps of passing air through said fourth zone containing heated refractory material to preheat said air, passing said preheated air through said third zone in direct contact with combustible material deposited on said catalyst during said make period, said combustible material burning in the presence of said preheated air and heating said catalyst, passing the products of combustion resulting from the reaction between the combustible material and the preheated air through said second zone to heat said second zone and passing the products of combustion leaving said second zone through the first zone containing said heat-storing refractory material to heat said material and removing said products of combustion from said first zone.

2. A process according to claim 1, including subsequent to a heating period in each cycle an additional step of passing air through the third zone and then through the fourth zone to promote the further combustion of combustible material deposited on the catalyst during a previous make period.

References Cited in the file of this patent

UNITED STATES PATENTS

| 2,605,176 | Pearson | July 29, 1952 |
| 2,692,193 | Riesz et al. | Oct. 19, 1954 |

FOREIGN PATENTS

| 1,057,050 | France | Oct. 28, 1953 |

OTHER REFERENCES

American Gas Journal, vol. 171, page 14 (Oct. 1949).
American Gas Association, Proceedings, 1951, R. J. Horn P "Oil Gas Production of the World's First Reverse Flow Regenerative Machine," pages 527–542.